Figure 6:
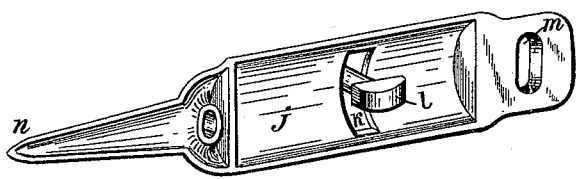

(No Model.)  2 Sheets—Sheet 1.
W. J. GOHN.
CULTIVATOR.
No. 461,674.  Patented Oct. 20, 1891.
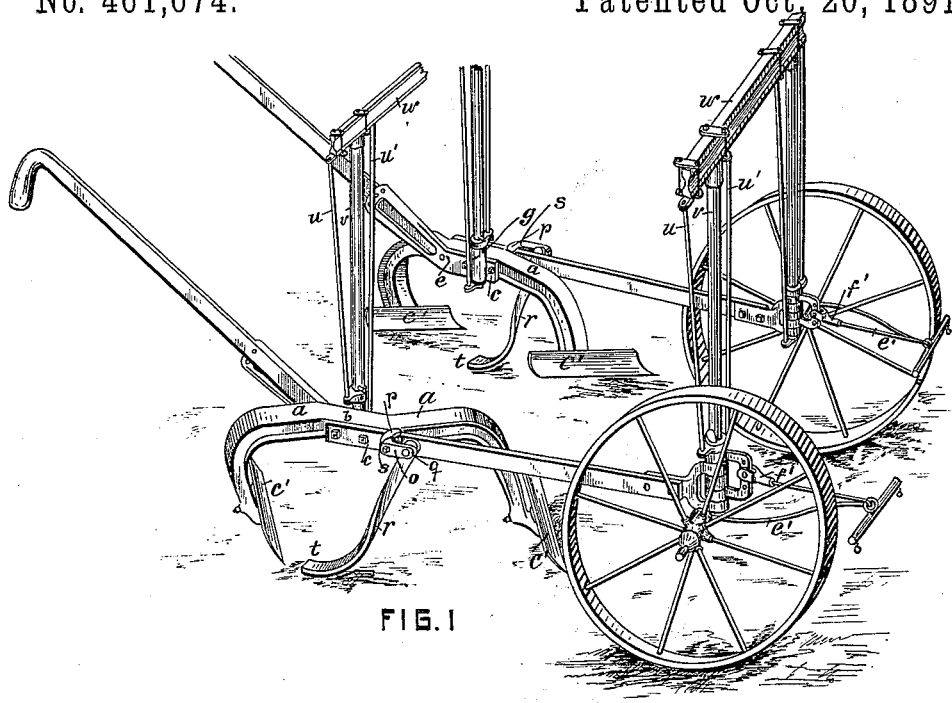
FIG. 1
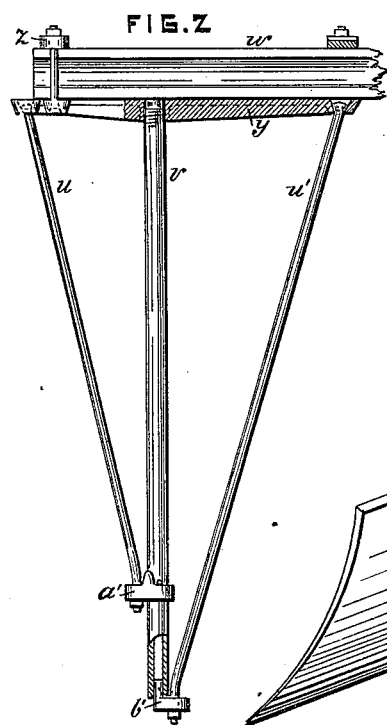
FIG. 2
FIG. 3
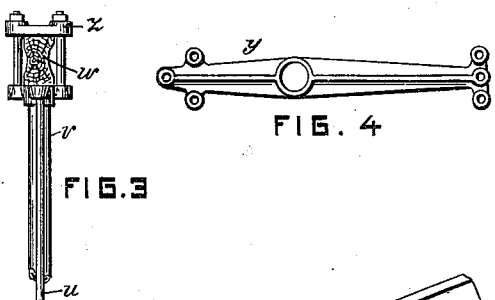
FIG. 4
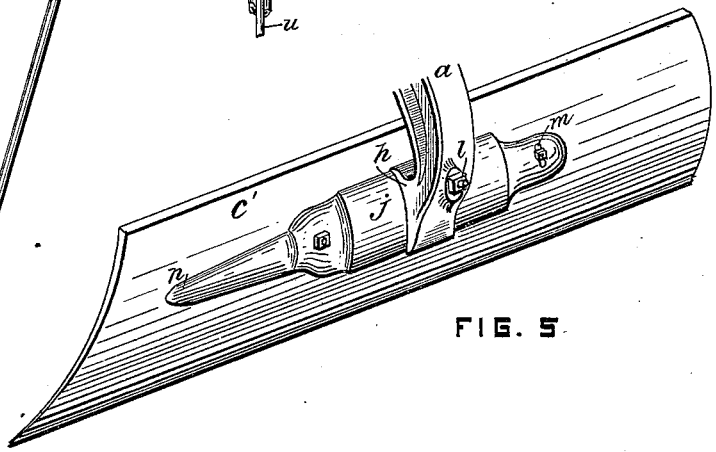
FIG. 5
Witnesses  Inventor
William J. Gohn
By his Attorney (No Model.)  2 Sheets—Sheet 2.

W. J. GOHN.
CULTIVATOR.

No. 461,674. Patented Oct. 20, 1891.

Witnesses
G. M. Copenhaver
D. W. Naylor

Inventor
William J. Gohn
By his Attorney
A. W. Ruff

UNITED STATES PATENT OFFICE.

WILLIAM JAMES GOHN, OF DANVILLE, ILLINOIS.

CULTIVATOR.

SPECIFICATION forming part of Letters Patent No. 461,674, dated October 20, 1891.

Application filed March 10, 1891. Serial No. 384,442. (No model.)

*To all whom it may concern:*

Be it known that I, WILLIAM JAMES GOHN, of Danville, in the county of Vermilion and State of Illinois, have invented certain new and useful Improvements in Corn-Cultivators; and I do hereby declare the following to be a full, clear, and exact description of the invention, such as will enable others skilled in the art to which it appertains to make and use the same.

My invention relates to improvements in cultivators of the type shown in Letters Patent Nos. 403,426 and 428,559, granted to me May 14, 1889, and May 20, 1890, respectively; and it consists in certain novel features of construction and the combination and arrangement of parts, as will be hereinafter more fully disclosed in the drawings, specifications, and claims.

My present improvements consist of a strong, durable, and simple device for holding the blade-blocks in their places, which I name the "lower arch," an improvement in the upper arch mentioned in former patents, a simple device for connecting the handle with upper and lower arches, the shape of the blade, the shape of the blade-block, and the manner of using the iron bar for moving cultivator from field to field. These objects I accomplish by the use of the mechanism illustrated in the accompanying drawings.

Figure 7:
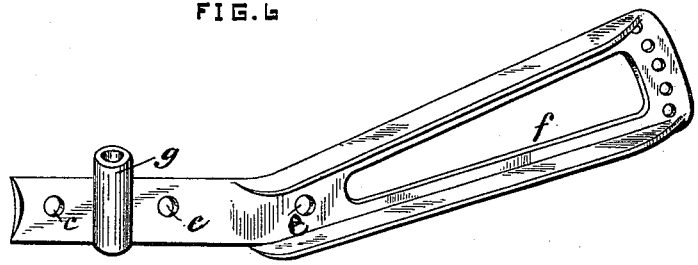
Figure 9:
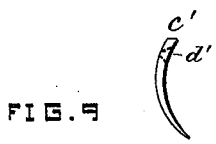
Figure 8:

Figure 1 is a perspective view showing the cultivator arranged to be moved from one place to another. Fig. 2 is a sectional front view of the upper arch. Fig. 3 is a side view of the parts shown in Fig. 2. Fig. 4 is a plan view of the plate for holding the upper end of the braces and the vertical rods of the upper arch. Fig. 5 is an enlarged detailed perspective view of one of the ends of the lower arch with blade attached, looking at the rear, so as to show the device for connecting the blade-block with the blade attached thereto. Fig. 6 is an enlarged detailed perspective view of the blade-block, showing the inside and the bolt for connecting blade-block to lower end of arch. Fig. 7 is a detailed perspective view of the handle-plate for connecting handle, the upper and the lower arches. Fig. 8 is a front view of the blade, showing a concave surface. Fig. 9 is an end view of the blade, more clearly showing its concavity.

The draft-hooks are different from former patent; but I make no claim on the change.

In my present device I employ only a single beam for each pair of blades, and the shanks or standards for carrying the blades are formed integral with the arches $a$, which are secured to the rear ends of the beams. The said arches $a$ are formed with bends, and the ends of the arches are thus brought out of line with each other and the blades consequently made to run in different and parallel paths. Fastening-bolts $c$ are inserted through the arches, the beams, and the handle-plates to secure the same together.

$w$ is a wooden bar resting on the plate $y$, the large hole of which is threaded to receive the iron pipe $v$. The other six small holes in plate $y$ are not threaded, but are used for rods or bolts. The rods $u$ and $u'$ have countersunk heads and pass through holes in plate $y$ and are fastened below, the outside one in a swivel or collar $a'$, with a hole at the outside to receive $u$, and the inside one in a short right-angled casting $b'$, entering the pipe $v$ from the bottom.

$z$ is a clip through which is passed two bolts fastening plate $y$ to bar $w$ adjustably.

$g$ is a box on the handle-plate $f$, through which the standard $v$ passes, the swivel resting on said box, while just above the swivel a spring-key is passed through the standard to hold the swivel in position.

$e$ is a bolt-hole used in connecting the lower end of the handle to the handle-plate. The four small holes in the handle-plate are for adjusting the handle to different heights.

$d'$ $d'$ are countersunk holes in the scraper-blade, through which suitable bolts are passed to connect the scraper-blade to the block $j$, as shown in Fig. 5.

In Fig. 6, $l$ is a bolt to fasten the block $j$ to end of lower arch $a$, and $n$ is a projection to brace point of blade. $m$ is an oblong hole to receive a suitable bolt, and by means of the shape of the hole the blade can be adjusted to raise or lower the point. $k$ is a bolt-hole or slot, (the shape as shown in drawings,) by means of which the edge of the blade can be raised or lowered.

Referring to Fig. 1, upon the side of the beam I secure the clip $o$, which is provided with lips $p$ $p$, engaging the upper and lower edges of the beam to hold it against twisting and which has the forwardly-extending lip $q$, between which and the beam I pivot the runner $r$, as shown. The shape of the clip is such that shoulders S are found on upper and lower sides of the same at the base of the lip $q$ to limit the movement of the runner on its pivot. The runner $r$ consists of a flat metallic bar, having its free end so bent and twisted that it will rest squarely upon the surface of the ground when the runner is turned down, as shown at $t$. When the machine is at work, the runner is turned upward and backward and rests upon the upper shoulder $s$ of the clip; but when it is desired to move the cultivator to another field the runners are turned down and will then assume the position shown in Fig. 1, raising the blades from the ground and consequently permitting the device to be carried over roads without injuring the blades.

It will be readily seen from the foregoing description, taken in connection with the accompanying drawings, that I have produced a cultivator which is very simple in its construction and yet very strong and durable.

The advantages of the device are thought to be obvious, and further reference thereto is deemed unnecessary.

Having thus described my invention, what I claim, and desire to secure by Letters Patent, is—

1. The combination of the shank having a concave recess in its front side at its lower end, the blade-holder adjustably secured in said recess and provided with an extended bracing-point, and the blade pivoted to said bracing-point and secured to the opposite end of the blade-holder by a bolt-and-slot connection.

2. The combination, with the beam and the standard, of the arch, the handle, and the handle-plate rigidly secured to the standard and having the handle secured thereto and provided with a journal-box for the arch.

3. The combination of the beam, the arched standard secured thereto, the handle-plate rigidly secured to the beam and the standard and provided with diverging ribs at its rear end, and the handle pivoted to the handle-plate and adjustable between said ribs.

In testimony whereof I have signed this specification in the presence of two subscribing witnesses.

WILLIAM JAMES GOHN.

Witnesses:
 GEO. W. WHYTE,
 WM. A. YOUNG.